US010126445B2

(12) United States Patent
Hashizume et al.

(10) Patent No.: US 10,126,445 B2
(45) Date of Patent: Nov. 13, 2018

(54) RADIATION DETECTING ELEMENT SENSITIVITY CORRECTION METHOD AND RADIATION TOMOGRAPHY DEVICE

(71) Applicant: SHIMADZU CORPORATION, Kyoto (JP)

(72) Inventors: Nobuya Hashizume, Kyoto (JP); Keishi Kitamura, Kyoto (JP); Tetsuya Kobayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/736,168

(22) PCT Filed: Apr. 5, 2016

(86) PCT No.: PCT/JP2016/061172
§ 371 (c)(1),
(2) Date: Dec. 13, 2017

(87) PCT Pub. No.: WO2016/203822
PCT Pub. Date: Dec. 22, 2016

(65) Prior Publication Data
US 2018/0196151 A1 Jul. 12, 2018

(30) Foreign Application Priority Data
Jun. 18, 2015 (JP) .................. 2015-122651

(51) Int. Cl.
G01T 7/00 (2006.01)
G01T 1/172 (2006.01)
G01T 1/29 (2006.01)

(52) U.S. Cl.
CPC .............. G01T 7/005 (2013.01); G01T 1/172 (2013.01); G01T 1/2985 (2013.01)

(58) Field of Classification Search
None
See application file for complete search history.

(56) References Cited

U.S. PATENT DOCUMENTS 5,703,369 A * 12/1997 Mori .................. G01T 1/1611
250/363.03
8,487,264 B2 7/2013 Hashizume et al.
(Continued)

FOREIGN PATENT DOCUMENTS

JP 2008-170329 A 7/2008
WO 2010/013356 A1 2/2010

OTHER PUBLICATIONS

International Search Report dated Jun. 28, 2016 of corresponding International application No. PCT/JP2016/061172; 8 pgs.
(Continued)

Primary Examiner — Yara B Green
(74) Attorney, Agent, or Firm — Maier & Maier, PLLC

(57) ABSTRACT

Sensitivity correction for multiple γ radiation detectors is performed by use of sensitivity coefficients obtained through a first sensitivity coefficient calculation step for obtaining sensitivity coefficients, classified according to sensitivity factors, on the basis of coincidence counting data collected as a result of detection of γ radiation emitted from a rotated rod-shaped calibration radiation source, and through a third sensitivity coefficient calculation step for obtaining sensitivity coefficients derived from a geometrical arrangement on the basis of coincidence counting data collected in a state where arrangement of the γ radiation detectors is changed. A re-constructed image is obtained on the basis of data acquired after the sensitivity correction is finished.

10 Claims, 4 Drawing Sheets

(56) References Cited

U.S. PATENT DOCUMENTS

| | | | | |
|---|---|---|---|---|
| 2003/0108229 A1* | 6/2003 | Tanaka | ............... | G01T 1/2985 |
| | | | | 382/131 |
| 2007/0116183 A1* | 5/2007 | Ueki | ................ | A61B 6/5258 |
| | | | | 378/207 |
| 2011/0278443 A1* | 11/2011 | Mizuta | ............... | G01T 1/1644 |
| | | | | 250/252.1 |
| 2014/0198892 A1* | 7/2014 | Yamakawa | ........... | A61B 6/032 |
| | | | | 378/4 |

OTHER PUBLICATIONS

Badawi RD et al., "Developments in component-based normalization for 30 PET", Phys. Med. Biol., 1999, p. 571-594, vol. 44; 24 pgs.

Badawi RD et al., "Algorithms for calculating detector efficiency normalization coefficients for true coincidences in 3D PET", Phys. Med. Biol., 1998, p. 189-205, vol. 43; 17 pgs.

Badawi RD et al., "A comparison of normalization effects on three whole-body cylindrical 3D PET systems", Phys. Med. Biol., 2000, p. 3253-3266, vol. 45; 14 pgs.

\* cited by examiner

RADIATION DETECTING ELEMENT SENSITIVITY CORRECTION METHOD AND RADIATION TOMOGRAPHY DEVICE

TECHNICAL FIELD

This invention relates to a sensitivity correction method for a radiation detecting element that detects radiation generated from a radiopharmaceutical in a test object and a radiation tomography device that performs radiation tomography by detecting radiation generated from the radiopharmaceutical in the test object.

BACKGROUND ART

In positron emission tomography (PET) of a radiation tomography device, a sensitivity difference between detectors needs to be calibrated to obtain homogeneous sensitivity of all detectors at the time of obtaining a reconstructed image. Hereinafter, this calibration will be referred to as "sensitivity correction". A coefficient for sensitivity correction (hereinafter referred to as "sensitivity coefficient") is calculated from actual data collected using a calibration radiation source, and a method of calculating a sensitivity coefficient has two types.

The first method is a direct method of obtaining sensitivity coefficients for all detector pairs. In the direct method, the sensitivity coefficients of all detector pairs are directly obtained. However, when the number of detectors is large, the number of detector pairs becomes enormous by the square of the number of detectors. Therefore, statistical accuracy per pair is lowered, and the number of sensitivity coefficients becomes enormous.

The next one is an "element-by-element sensitivity correction method" of decomposing each factor that varies sensitivity and setting a product thereof to a sensitivity coefficient of a detector pair (for example, see Patent Documents 1 and 2 and Non-Patent Documents 1 to 3). In this element-by-element sensitivity correction method, when a pair of coinciding detector rings is set to (u, v), and a pair of coinciding detectors in a ring is set to (i, j), a sensitivity correction coefficient $NC_{uivj}$ is decomposed into elements as in the following Equation (1).

$$NC_{uivj} = \varepsilon_{ui} \times \varepsilon_{vj} \times b_{uvk} \times d_{uvrk} \times g_{uvr} \times f_{uv} \quad (1)$$

Here, In Equation (1), $\varepsilon_{ui}$ and $\varepsilon_{vj}$ denote sensitivities unique to detectors, $d_{uvrk}$ denotes a crystal interference factor, $f_{uv}$ denotes ring pair sensitivity, $b_{uvk}$ denotes a block profile factor, $g_{uvr}$ denotes a radial direction geometric factor, k denotes a crystal relative position in a block, and r denotes a radial direction position. In these elements, $g_{uvr}$, $d_{uvrk}$, etc. are geometrically determined elements (hereinafter referred to as "geometric factors"). In addition, $\varepsilon_{ui}$, $\varepsilon_{vj}$, and $b_{uvk}$ are non-geometric factors which change over time.

In the element-by-element sensitivity correction method, the product of sensitivity coefficients is used for expression, and thus the number of sensitivity coefficients is small when compared to the direct method. In addition, since each factor obtained by decomposing the sensitivity coefficient is added using geometric symmetry, statistical accuracy can be improved. However, the sensitivity coefficient is indirectly obtained by the product of factors, and thus is an approximate numerical value. In a recent PET apparatus, the element-by-element sensitivity correction method starts to be used for the purpose of high resolution, simplification of calibration and improvement of statistical accuracy.

A calibration flow of a conventional element-by-element correction method is illustrated in FIG. 1 and FIG. 2 of Non-Patent Document 1. FIG. 1 is a calibration flow for calculation of a geometric factor using a conventional low scattering calibration radiation source and FIG. 2 is a calibration flow for calculation of a non-geometric factor using a conventional uniform cylindrical calibration radiation source. The geometric factor which does not change over time is calculated using the low scattering calibration radiation source, and the non-geometric factor which changes over time is calculated using data of the uniform cylindrical calibration radiation source corrected by a coefficient of the geometric factor. Then, a sensitivity coefficient of a specific pair of detectors is obtained using Equation (1) shown above. With regard to a specific calibration flow, refer to Non-Patent Document 1.

CITATION LIST

Patent Document

Patent Document 1: JP-A-2008-170329
Patent Document 2: WO 2010/013356

Non-Patent Document

Non-Patent Document 1: Badawi R D, Marsden P K: Developments in component-based normalization for 3D PET. Phys. Med. Biol. 44, 571-594, 1999
Non-Patent Document 2: Badawi R D, Lodge M A, Marsden P K: Algorithms for calculating detector efficiency normalization coefficients for true coincidences in 3D PET. Phys. Med. Biol. 43, 189-205, 1998
Non-Patent Document 3: Badawi R D, Ferreira N C, Kohlmyer S G, Dahlbom M, Marsden P K, Lewellen T K: A comparison of normalization effects on three whole-body cylindrical 3D PET systems. Phys. Med. Biol. 45, 3253-3266, 2000

SUMMARY OF THE INVENTION

Technical Problem

However, such a conventional element-by-element sensitivity correction method has the following problems.

In more detail, there is a problem that a flexible PET apparatus supporting multi-modality does not correspond to the conventional element-by-element sensitivity correction method. The conventional element-by-element sensitivity correction method is valid when a detector group has a circular arrangement and a positional relation is fixed.

As illustrated in FIG. 3, the flexible PET apparatus supporting multi-modality includes two detector heads 2A and 2B in which arcuate detector groups are disposed, and the respective detector heads 2A and 2B are close to each other as indicated by a two-dot chain line of FIG. 3. As a result, a positional relation becomes variable and elliptical, and an assumption of the element-by-element sensitivity correction method fails and becomes invalid (see AB at the time of non-approach and A'B at the time of approach illustrated in FIG. 3).

In addition, when the two detector heads are close to each other, in the case of a detector pair in the same detector head, even though a sensitivity coefficient is invariant, a distance between detector heads facing each other changes, and incidence angles of a γ-ray on the detectors are different from each other. Thus, sensitivity of a geometric factor changes in the detector heads facing each other. As a result, artifacts occur in a reconstructed image.

The invention has been conceived in view of such circumstances, and an object of the invention is to provide a sensitivity correction method for a radiation detecting element and a radiation tomography device capable of obtaining a reconstructed image free of artifacts even when arrangement of a plurality of radiation detecting elements included in a detector is variant and is not circular arrangement.

Solution to Problem

The invention adopts configurations below to attain such an object.

In more detail, a sensitivity correction method according to the invention is a sensitivity correction method for a radiation detecting element detecting radiation generated from a radiopharmaceutical in a test object, the sensitivity correction method including a first sensitivity coefficient calculation step of obtaining sensitivity coefficients classified according to sensitivity factors based on coincidence counting data collected by a plurality of radiation detecting elements, a second sensitivity coefficient calculation step of obtaining a sensitivity coefficient of a non-geometric factor based on the collected coincidence counting data before change of arrangement of the plurality of radiation detecting elements after the first sensitivity coefficient calculation step, and a third sensitivity coefficient calculation step of obtaining a sensitivity coefficient derived from geometrical arrangement based on the collected coincidence counting data in a state in which the arrangement of the plurality of radiation detecting elements is changed after the second sensitivity coefficient calculation step, in which sensitivities of the radiation detecting elements are corrected using the sensitivity coefficients obtained in the first sensitivity coefficient calculation step, the second sensitivity coefficient calculation step, and the third sensitivity coefficient calculation step.

[Effects] According to the sensitivity correction method according to the invention, first, a sensitivity coefficient is obtained in the first sensitivity coefficient calculation step. After the first sensitivity coefficient calculation step, a sensitivity coefficient is obtained in the second sensitivity coefficient calculation step before a change in arrangement of the plurality of radiation detecting elements. After the second sensitivity coefficient calculation step, a sensitivity coefficient is obtained in the third sensitivity coefficient calculation step in a state in which the arrangement of the plurality of radiation detecting elements is changed. Specifically, in the first sensitivity coefficient calculation step, sensitivity coefficients classified according to sensitivity factors are obtained. Even when the arrangement of the plurality of radiation detecting elements is not changed, a non-geometric factor changes over time. Therefore, a sensitivity coefficient of a non-geometric factor is obtained in the second sensitivity coefficient calculation step based on collected coincidence counting data before change of the arrangement of the plurality of radiation detecting elements. Then, in the third sensitivity coefficient calculation step, a sensitivity coefficient derived from geometrical arrangement is obtained based on collected coincidence counting data in the state in which in which arrangement of the plurality of radiation detecting elements is changed. In this way, sensitivity correction of the radiation detecting elements is performed using the sensitivity coefficients obtained in the first sensitivity coefficient calculation step, the second sensitivity coefficient calculation step, and the third sensitivity coefficient calculation step, thereby obtaining a reconstructed image based on data after the sensitivity correction. As a result, even when arrangement of the plurality of radiation detecting elements included in the detector is variable and is not circular arrangement, it is possible to obtain a reconstructed image free of artifacts.

In a specific example, a sensitivity coefficient corresponding to a case in which the arrangement of the plurality of radiation detecting elements is changed is represented by a product of a sensitivity coefficient of a geometric factor obtained before the change of the arrangement and a sensitivity coefficient of a non-geometric factor with respect to a combination in which a positional relation is invariant irrespective of the arrangement of the radiation detecting elements (for example, the same detector head). Further, the sensitivity coefficient is represented by a product of a sensitivity coefficient of a geometric factor obtained after the change of the arrangement and a sensitivity coefficient of a non-geometric factor with respect to a combination geometrically affected by a positional relation of the radiation detecting elements (for example, detector heads facing each other).

In addition, it is preferable to obtain the correction coefficient from a ratio of coincidence counting data collected at the same time using the same calibration radiation source before and after the change of the arrangement of the plurality of radiation detecting elements. In this way, it is possible to correct a difference generated due to the change of the arrangement at the time of using the same calibration radiation source. Consequently, for example, in a case in which after another calibration radiation source (the former: first calibration radiation source) is used before the change of the arrangement, the same calibration radiation source (the latter: second calibration radiation source) is used before and after the change of the arrangement of the plurality of radiation detecting elements, it is possible to correct a difference between the former before the change of the arrangement and the latter after the change of the arrangement by multiplying the obtained correction coefficient by the right side of above Equation (1) in the former.

In addition, coincidence counting data collected after the change of the arrangement of the plurality of radiation detecting elements corresponds to a combination geometrically affected at least by a positional relation of the radiation detecting elements. That is, it is possible to obtain sensitivity coefficient data with respect to the combination geometrically affected by the positional relation of the radiation detecting elements (for example, the detector heads facing each other) based on the coincidence counting data collected after the change of the arrangement.

In addition, in the first sensitivity coefficient calculation step, it is preferable to obtain the sensitivity coefficient using a calibration radiation source below. In more detail, when a rod-shaped radiation source for calibration rotatable along the plurality of radiation detecting elements is used, the rod-shaped radiation source for calibration is rotated along the plurality of radiation detecting elements, thereby being approximated to a ring radiation source for calibration. In addition, it is possible to use a ring radiation source for calibration provided along the plurality of radiation detecting elements. In addition, in a case of using a plate radiation source for calibration rotatable along the plurality of radiation detecting elements, the plate radiation source for calibration may be rotated along the plurality of radiation detecting elements. In this way, in the first sensitivity coefficient calculation step, sensitivity coefficients classified according to sensitivity factors are obtained based on collected coincidence counting data by detecting radiation from the rotated rod-shaped radiation source for calibration (that is, the rod-shaped radiation source for calibration approximated to the ring radiation source for calibration), the ring radiation source for calibration, or the rotated plate radiation source for calibration.

In addition, in the second sensitivity coefficient calculation step, it is preferable to obtain a sensitivity coefficient using a calibration radiation source below. In more detail, in the second sensitivity coefficient calculation step, it is possible to obtain a sensitivity coefficient of a non-geometric factor which changes over time based on coincidence counting data collected by detecting radiation from a cylindrical radiation source for calibration imitating an actual test object before the change of the arrangement of the plurality of radiation detecting elements.

In addition, in a case in which a plurality of detector heads, each of which includes the plurality of radiation detecting elements, is included, and the respective detector heads are configured such that a distance between the respective detector heads can be changed, when the arrangement of the plurality of radiation detecting elements is changed by bringing the respective detector heads close to each other, it is preferable to obtain a sensitivity coefficient using a calibration radiation source below. In more detail, when the respective detector heads are brought close to each other, there is concern that the rod-shaped radiation source for calibration rotatable along the plurality of radiation detecting elements or the ring radiation source for calibration provided along the plurality of radiation detecting elements may interfere with the respective detector heads. Therefore, a plate radiation source for calibration installed at a center of the respective detector heads is used, or a rod-shaped radiation source for calibration that can reciprocate along a central axis of the respective detector heads is used. When the rod-shaped radiation source for calibration is used, the rod-shaped radiation source for calibration is reciprocated along the central axis of the respective detector heads, thereby being approximated to the plate radiation source for calibration. In the third sensitivity coefficient calculation step, a sensitivity coefficient derived from geometrical arrangement is obtained based on coincidence counting data collected by detecting radiation from the plate radiation source for calibration or the reciprocated rod-shaped radiation source for calibration (that is, the rod-shaped radiation source for calibration approximated to the plate radiation source for calibration) in a state in which the respective detector heads are brought close to each other. When such a plate radiation source for calibration or a reciprocated rod-shaped radiation source for calibration (that is, a rod-shaped radiation source for calibration approximated to the plate radiation source for calibration) is used, it is possible to prevent interference between the calibration radiation source and each detector head even when the respective detector heads are brought close to each other.

In addition, a radiation tomography device according to the invention is a radiation tomography device performing radiation tomography by detecting radiation generated from a radiopharmaceutical in a test object, the radiation tomography device including a plurality of detector heads, each of which has a plurality of radiation detecting elements, the respective detector heads being configured such that a distance between the respective detector heads is changeable, and arithmetic means that performs an arithmetic operation, in which the arithmetic means performs a first sensitivity coefficient calculation step of obtaining sensitivity coefficients classified according to sensitivity factors based on coincidence counting data collected by the plurality of radiation detecting elements, a second sensitivity coefficient calculation step of obtaining a sensitivity coefficient of a non-geometric factor based on the collected coincidence counting data before change of arrangement of the plurality of radiation detecting elements after the first sensitivity coefficient calculation step, and a third sensitivity coefficient calculation step of obtaining a sensitivity coefficient derived from geometrical arrangement based on the collected coincidence counting data in a state in which the arrangement of the plurality of radiation detecting elements is changed after the second sensitivity coefficient calculation step, and sensitivities of the radiation detecting elements are corrected using the sensitivity coefficients obtained in the first sensitivity coefficient calculation step, the second sensitivity coefficient calculation step, and the third sensitivity coefficient calculation step.

[Effects] The radiation tomography device according to the invention includes the arithmetic means that performs the first sensitivity coefficient calculation step, the second sensitivity coefficient calculation step, and the third sensitivity coefficient calculation step as described in the sensitivity correction method according to the invention. As described in the sensitivity correction method according to the invention, a reconstructed image is obtained based on data after sensitivity correction by correcting sensitivities of the radiation detecting elements using the sensitivity coefficients obtained in the first sensitivity coefficient calculation step, the second sensitivity coefficient calculation step, and the third sensitivity coefficient calculation step. As a result, even when arrangement of the plurality of radiation detecting elements included in the detector is variable and is not circular arrangement, it is possible to obtain a reconstructed image free of artifacts.

Advantageous Effects of the Invention

According to a sensitivity correction method for a radiation detecting element and a radiation tomography device according to the invention, a reconstructed image is obtained based on data after sensitivity correction by correcting sensitivities of the radiation detecting elements using the sensitivity coefficients obtained in the first sensitivity coefficient calculation step (of obtaining sensitivity coefficients classified according to sensitivity factors based on coincidence counting data collected by the plurality of radiation detecting elements), the second sensitivity coefficient calculation step (of obtaining a sensitivity coefficient of a non-geometric factor based on the collected coincidence counting data before change of arrangement of the plurality of radiation detecting elements after the first sensitivity coefficient calculation step), and the third sensitivity coefficient calculation step (of obtaining a sensitivity coefficient derived from geometrical arrangement based on the collected coincidence counting data in a state in which the arrangement of the plurality of radiation detecting elements is changed after the second sensitivity coefficient calculation step). As a result, even when arrangement of the plurality of radiation detecting elements included in the detector is variable and is not circular arrangement, it is possible to obtain a reconstructed image free of artifacts.

BRIEF DESCRIPTION OF THE DRAWINGS

FIG. 4(a) is a schematic view of a ring radiation source at the time of non-approach, FIG. 4(b) is a schematic view of a cylindrical radiation source at the time of non-approach, FIG. 4(c) is a schematic view of a plate radiation source at the time of approach.

EMBODIMENTS

Hereinafter, embodiments of the invention will be described with reference to drawings.

Figure 1:
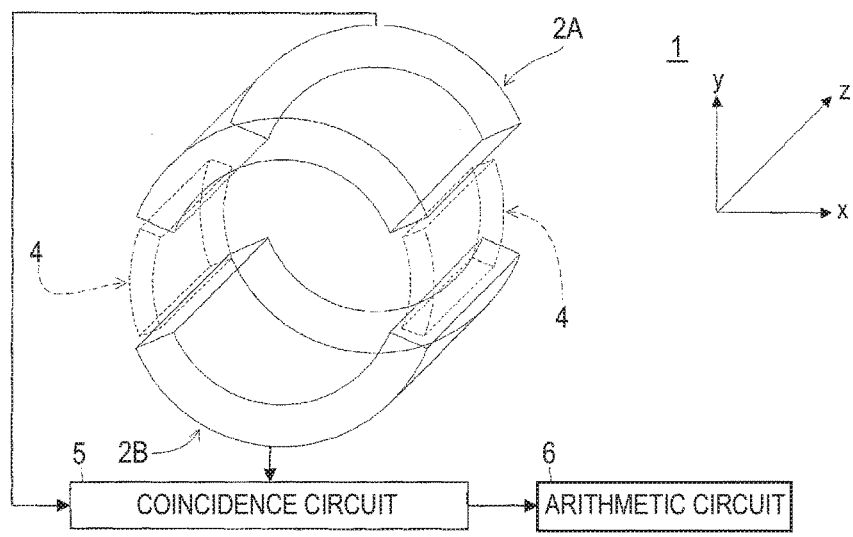
FIG. 1 is a schematic perspective view and a block diagram illustrating one mode of a detector head of a flexible PET apparatus supporting multi-modality according to an embodiment.
Figure 2:
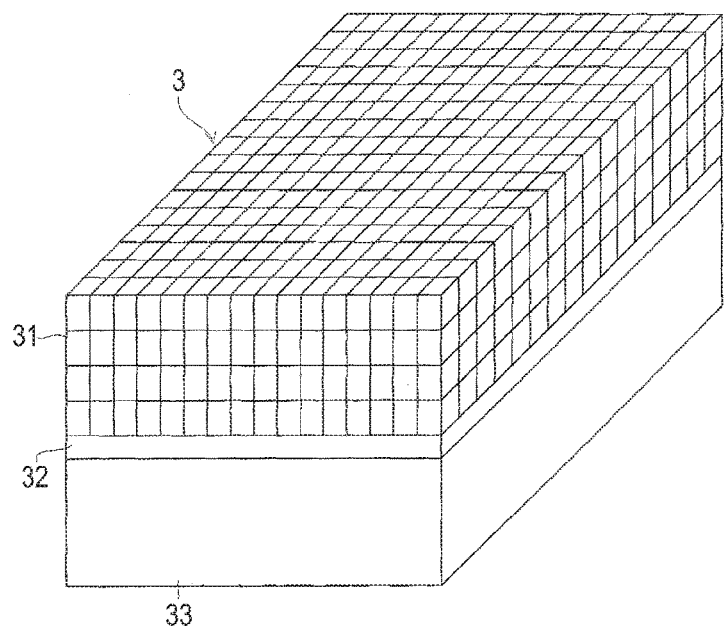
FIG. 2 is a schematic perspective view of a γ radiation detector.
Figure 3:
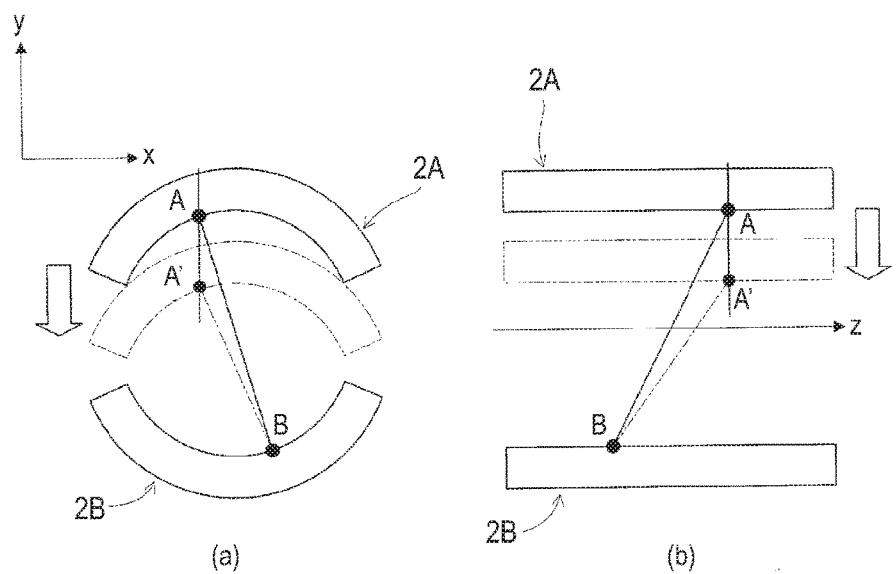
FIG. 3(a) is a schematic view of the detector head seen from a depth direction.
FIG. 3(b) is a schematic view seen from a horizontal direction orthogonal to the depth direction.

FIG. 1 is a schematic perspective view and a block diagram illustrating one mode of a detector head of a flexible PET apparatus supporting multi-modality according to an embodiment. FIG. 2 is a schematic perspective view of a γ radiation detector. FIG. 3(a) is a schematic view of the detector head viewed in a depth direction, and FIG. 3(b) is a schematic view viewed in a horizontal direction orthogonal to the depth direction.

As illustrated in FIG. 1, the flexible PET apparatus supporting multi-modality (hereinafter simply referred to as a "PET apparatus") 1 includes detector heads 2A and 2B. As illustrated in FIG. 2, one detector head includes a total of 18×3 detector blocks 31 in which eighteen detector blocks 31 (γ radiation detectors 3) are arranged in an arcuate shape and three detector blocks 31 are arranged in the depth direction z (see FIG. 1). Here, 16×16 detector crystals arranged in vertical and horizontal directions are stacked in four layers in one of the detector blocks 31. A specific configuration of the γ radiation detector 3 other than the detector block 31 will be described below in FIG. 2. The flexible PET apparatus supporting multi-modality (PET apparatus) 1 corresponds to a radiation tomography device in the invention, the detector heads 2A and 2B correspond to a detector head in the invention, and the γ radiation detector 3 corresponds to a radiation detecting element in the invention.

As illustrated in FIG. 1, the detector heads 2A and 2B are configured to face each other. The detector heads 2A and 2B are normally located on a circumference of a 48-sided polygon. The number of the detector blocks 31 (γ radiation detectors 3) in a cross section of the two the detector heads 2A and 2B is 36 in total (18×2 in the arcuate shape). However, due to the 48-sided polygon, a gap region 4 corresponding to six is present in each of right and left sides. As described in the section "Technical Problem", in FIG. 3, the detector heads 2A and 2B may be brought close to each other while the detector heads 2A and 2B face each other. In this manner, the respective detector heads 2A and 2B are configured such that a distance between the respective detector heads 2A and 2B can be changed.

Besides, the PET apparatus 1 includes a coincidence circuit 5 and an arithmetic circuit 6. A specific function of the arithmetic circuit 6 will be described below with reference to FIG. 4. The arithmetic circuit 6 corresponds to arithmetic means in the invention.

When a radiopharmaceutical is administered to a test object (not illustrated) to which a radiopharmaceutical has been administered, two γ-rays are generated since a positron of a positron emission type RI disappears. The coincidence circuit 5 checks the position of the detector blocks 31 (see FIG. 2) and incidence timing of the γ-rays, and determines fed image information to be appropriate data (coincidence counting data) only when the γ-rays are simultaneously incident on the two detector blocks 31 on both sides of the test object. When the γ-rays are incident only on one of the detector blocks 31, the coincidence circuit 5 rejects the incidence. That is, the coincidence circuit 5 detects that the γ-rays are simultaneously observed (that is, coincidence) in the two γ radiation detectors 3 based on the above-described electric signal. The image information (coincidence counting data) collected by the coincidence circuit 5 is sent to the arithmetic circuit 6.

As illustrated in FIG. 2, the γ radiation detector 3 includes the detector blocks 31, a light guide 32 optically coupled to the detector blocks 31, and a photo multiplier tube (PMT) 33 optically coupled to the light guide 32. Each detector crystal included in the detector blocks 31 emits light in response to incidence of a γ-ray to convert from the γ-ray into light. Through this conversion, the detector crystal detects the γ-ray. Light emitted from the detector crystal is sufficiently diffused by the detector blocks 31 and input to the photo multiplier tube (hereinafter simply abbreviated to "PMT") 33 through the light guide 32. The PMT 33 multiplies the light converted by the detector blocks 31 and converts the multiplied light into an electric signal. The electrical signal is sent to the coincidence circuit 5 (see FIG. 1) as image information (coincidence counting data) as described above.

In addition, as illustrated in FIG. 2, the γ radiation detector 3 is a depth of interaction (DOI) detector including a plurality of layers in the depth direction. Even though FIG. 2 illustrates a four-layer DOI detector, the number of layers is not particularly limited as long as a plurality of layers is provided. In addition, the number of vertically and horizontally arranged detector crystals is not particularly limited as long as a plurality of detector crystals is provided.

Here, the DOI detector is formed by stacking the respective detector crystals in a depth direction of a radiation, and coordinate information of the depth direction (DOI) in which an interaction occurs and a lateral direction (a direction parallel to an incident plane) is obtained by calculation of a center of gravity. It is possible to further improve spatial resolution in the depth direction using the DOI detector. Therefore, the number of layers of the DOI detector corresponds to the number of layers of the detector crystals stacked in the depth direction.

Figure 4:
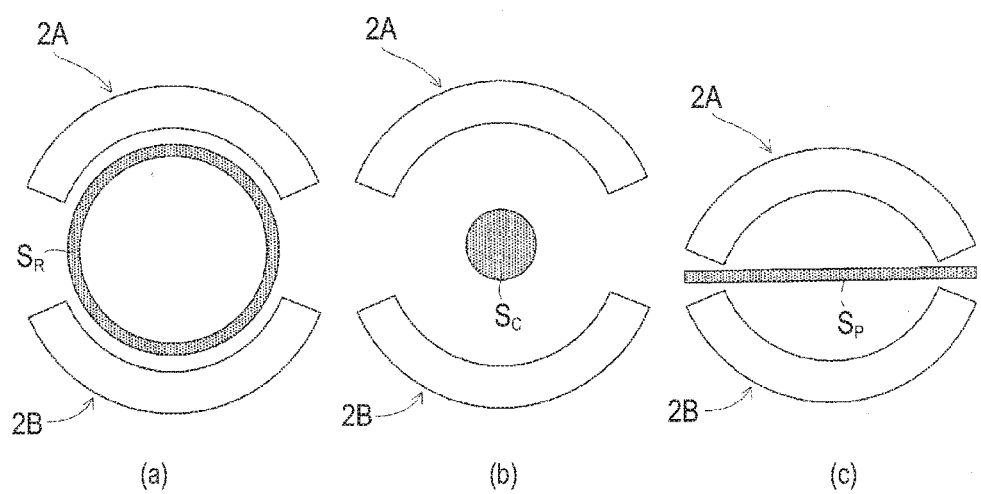
FIGS. 4(a) to 4(c) are schematic views of detector arrangement and types of the calibration radiation source.
Figure 5:
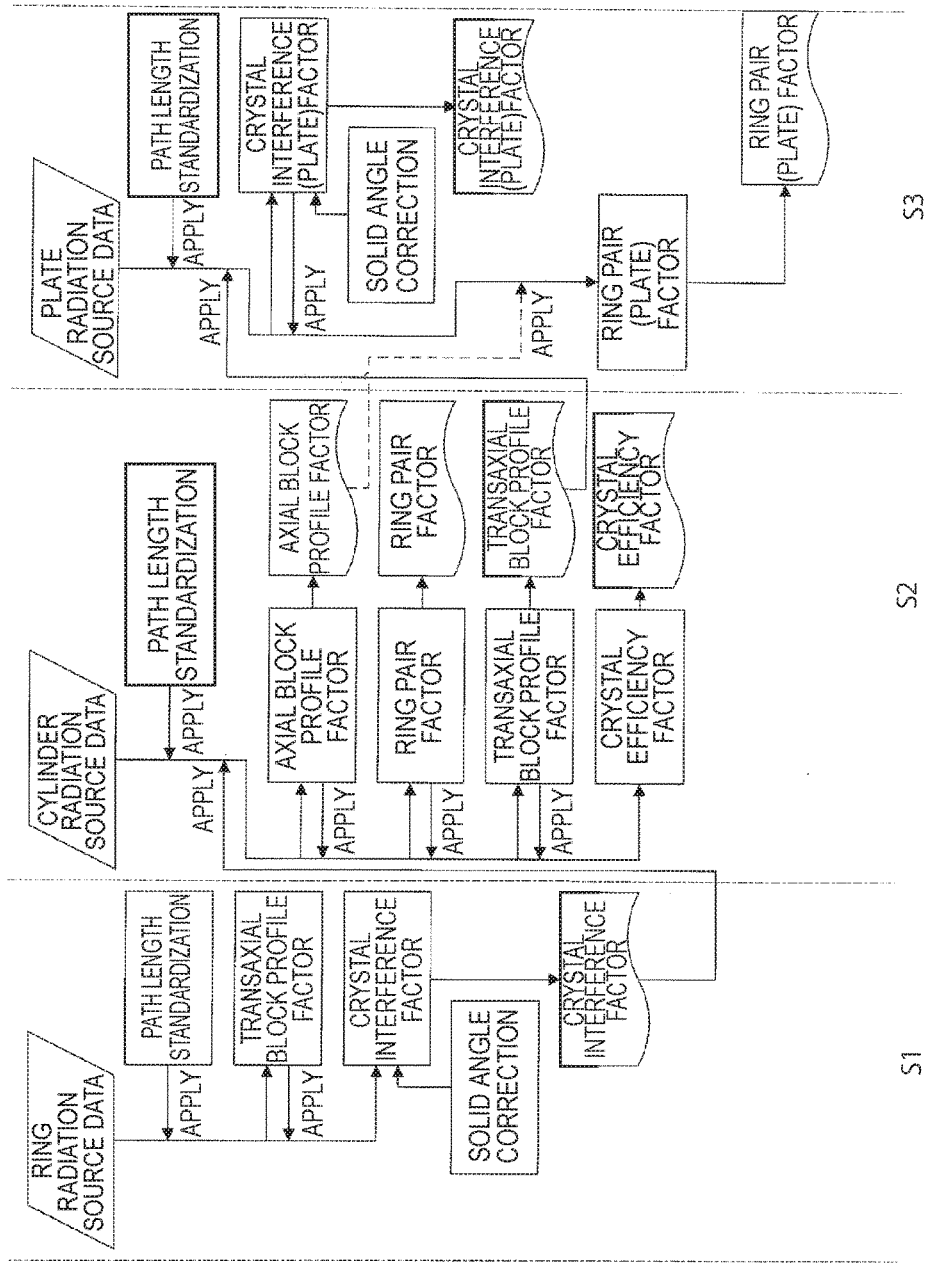
FIG. 5 is a flowchart illustrating a flow of a processing procedure of an element-by-element sensitivity correction method according to an embodiment.
Figure 6:
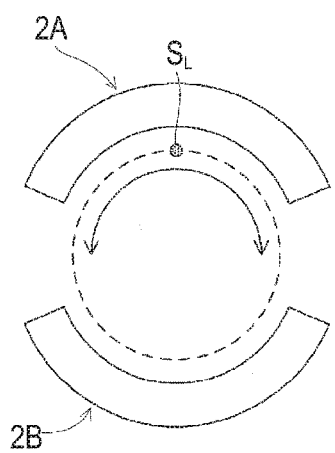
FIG. 6 is a schematic view at the time of rotating a rod-shaped radiation source, which is rotatable along the γ radiation detector of the detector head, along the γ radiation detector of the detector head.

Next, a specific configuration of the arithmetic circuit 6 will be described with reference to FIG. 4 to FIG. 6. FIGS. 4(a) to 4(c) are schematic views of detector arrangement and types of the calibration radiation source, FIG. 4(a) is a schematic view of a ring radiation source at the time of non-approach, FIG. 4(b) is a schematic view of a cylindrical radiation source at the time of non-approach, FIG. 4(c) is a schematic view of a plate radiation source at the time of approach. FIG. 5 is a flowchart illustrating a flow of a processing procedure of an element-by-element sensitivity correction method according to an embodiment. FIG. 6 is a schematic view at the time of rotating a rod-shaped radiation source, which is rotatable along the γ radiation detector of the detector head, along the γ radiation detector of the detector head.

Reference symbol $S_R$ of FIG. 4(a) denotes a ring radiation source for calibration (hereinafter simply abbreviated to a "ring radiation source"), reference symbol $S_C$ of FIG. 4(b) denotes a cylindrical radiation source for calibration (hereinafter simply abbreviated to a "cylindrical radiation source"), and reference symbol $S_P$ of FIG. 4(c) denotes a plate radiation source for calibration (hereinafter simply abbreviated to a "plate radiation source"). In the present embodiment, as illustrated in FIG. 6, a rod-shaped radiation source for calibration (hereinafter simply abbreviated to a "rod-shaped radiation source") $S_L$ rotatable along the γ radiation detectors 3 (see FIG. 2) (that is, the radiation detecting elements) of the detector heads 2A and 2B is used, and the rod-shaped radiation source $S_L$ is rotated along the γ radiation detectors 3 of the detector heads 2A and 2B, thereby being approximated to the ring radiation source $S_R$ illustrated in FIG. 4(a). Hereinafter, the rod-shaped radiation source $S_L$ illustrated in FIG. 6 will be described as the ring radiation source $S_R$ illustrated in FIG. 4(a). A thickness of the ring radiation source $S_R$ is about 5 mm, a diameter of the cylindrical radiation source $S_C$ is about 15 cm, a thickness of the plate radiation source $S_P$ is about 5 mm, and a diameter of the rod-shaped radiation source $S_L$ is about 15 cm.

In addition, in the present embodiment, three types are prepared and data of each of the types is collected. Here, the three types correspond to the ring radiation source $S_R$ approximated to a ring by rotating the rod-shaped radiation source $S_L$ (see FIG. 6) at the time of non-approach illustrated in FIG. 4(a), the uniform cylindrical radiation source $S_C$ installed at a center of the apparatus (the detector heads 2A and 2B) at the time of non-approach illustrated in FIG. 4(b), and the plate radiation source $S_P$ installed at the center of the apparatus (the detector heads 2A and 2B) at the time of approach illustrated in FIG. 4(c). The calibration radiation source is made of acrylic resin, and a uniform concentration of radioactive solution is sealed inside.

In addition, in FIG. 5, a transaxial block profile factor $b_{uvk}$ corresponds to a "Transaxial Block Profile Factor", a crystal interference factor $d_{uvrk}$ corresponds to a "Crystal Interference Factor", a block profile factor $b_{uvk}$ on a body axis cross section (body axis transverse plane) corresponds to an "Axial Block Profile Factor", a ring pair sensitivity $f_{uv}$ corresponds to a "Ring Pair Factor", sensitivities $\varepsilon_{ui}$ and $\varepsilon_{vj}$ unique to the detectors correspond to a "Crystal Efficiency Factor", a crystal interference factor $d_{Plate}$ at the time of the plate radiation source corresponds to a "Crystal Interference (Plate) Factor", and a ring pair sensitivity $f_{Plate}$ at the time of the plate radiation source corresponds to a "Ring Pair (Plate) Factor".

(Step S1)

As illustrated in the flowchart of FIG. 5, first, the crystal interference factor $d_{uvrk}$ (written as "Crystal Interference Factor") of the geometric factor that does not change overtime is calculated using coincidence counting data collected by the ring radiation source $S_R$ illustrated in FIG. 4(a). It is preferable to apply path length standardization (written as "Apply") before the crystal interference factor $d_{uvrk}$ (Crystal Interference Factor) of the geometric factor is calculated.

The path length standardization refers to standardization of coincidence counting data on a predetermined path using a length in which the path passes through the radiation source. A difference in length intersecting the radiation source between predetermined paths is corrected in a pseudo manner by performing the path length standardization. With regard to specific path length standardization, refer to Patent Document 1: JP-A-2008-170329.

Further, solid angle correction for correct a detector distance is performed. Specifically, a crystal interference factor $d_{uvrk}$ (Crystal Interference Factor) of a certain line of response (LOR) is divided by the square of a detector distance of the LOR. A coefficient of the crystal interference factor $d_{uvrk}$ (Crystal Interference Factor) obtained as a result thereof is output as a table. Here, the LOR refers to a virtual straight line connecting two coinciding detectors. Step S1 corresponds to a first sensitivity coefficient calculation step in the invention.

(Step S2)

Subsequently, the sensitivities $\varepsilon_{ui}$ and $\varepsilon_{vj}$ unique to the detectors (written as "Crystal Efficiency Factor") of the non-geometric factor that changes over time are calculated in order using coincidence counting data of the cylindrical radiation source $S_C$ illustrated in FIG. 4(b) subjected to correction of the geometric factor by the crystal interference factor $d_{uvrk}$ (Crystal Interference Factor). In this instance, the block profile factor $b_{uvk}$ (written as "Axial Block Profile Factor") on the body axis cross section (body axis transverse plane) and the transaxial block profile factor $b_{uvk}$ (written as "Transaxial Block Profile Factor") are calculated, and correction is performed on coincidence counting data of the plate radiation source $S_P$ illustrated in FIG. 4(c) in step S3.

In addition, the ring pair sensitivity $f_{uv}$ (written as "Ring Pair Factor") is calculated. Each factor obtained by calculation is output as a table. Step S2 corresponds to a second sensitivity coefficient calculation step in the invention.

(Step S3)

Finally, coincidence counting data of the plate radiation source $S_P$ illustrated in FIG. 4(c) is used to calculate only the crystal interference factor $d_{Plate}$ (written as "Crystal Interference (Plate) Factor") at the time of the plate radiation source affected by change in geometrical arrangement of the detectors due to proximity and the ring pair sensitivity $f_{Plate}$ (written as "Ring Pair (Plate) Factor") at the time of the plate radiation source.

In other words, since a positional relation of a combination of the same detector heads is invariant regardless of the arrangement of the γ radiation detectors 3 (radiation detecting elements), the crystal interference factor $d_{uvrk}$ (Crystal Interference Factor) and the ring pair sensitivity $f_{uv}$ (Ring Pair Factor) are not calculated in step S3. On the other hand, since a combination of detector heads facing each other is geometrically affected by a positional relation of the γ radiation detectors 3 (radiation detecting elements), the crystal interference factor $d_{Plate}$ (Crystal Interference (Plate) Factor) at the time of the plate radiation source and the ring pair sensitivity $f_{Plate}$ (Ring Pair (Plate) Factor) at the time of the plate radiation source are calculated.

Similarly to step S1, it is preferable to apply path length standardization before calculating these factors. A solid angle is corrected at coordinates at the time of approach with respect to the crystal interference factor $d_{Plate}$ (Crystal Interference (Plate) Factor) at the time of the plate radiation source. Coefficients of the crystal interference factor $d_{Plate}$ (Crystal Interference (Plate) Factor) at the time of the plate radiation source and the ring pair sensitivity $f_{Plate}$ (Ring Pair (Plate) Factor) at the time of the plate radiation source obtained by calculation are output as a table. Step S3 corresponds to a third sensitivity coefficient calculation step in the invention.

With regard to specific calculation of each factor, refer to Non-Patent Document 1. The flexible PET apparatus uses a fan-sum method since a gap is present between the detector heads. With regard to specific calculation of the transaxial block profile factor $b_{uvk}$ (Transaxial Block Profile Factor) or the ring pair sensitivity $f_{uv}$ (Ring Pair Factor) using the fan-sum method, refer to Patent Document 2: WO 2010/013356 A.

An equation for obtaining a correction coefficient $\alpha$ for correcting a difference between the plate radiation source at the time of approach and the ring radiation source at the time of non-approach is represented by the following Equation (2).

[Formula 1]

$$\frac{N_{near}}{N_{normal}} = \alpha \frac{1/L_{near}^2}{1/L_{normal}^2} \quad (2)$$

In the above Equation (2), $N_{near}$ denotes coincidence counting data (count value) collected using the plate radiation source at the time of approach, $N_{normal}$ denotes coincidence counting data (count value) collected using the plate radiation source at the time of non-approach, $L_{near}$ denotes a detector distance at the time of approach, and $L_{normal}$ denotes a detector distance at the time of non-approach. In this way, a difference between the plate radiation source and the ring radiation source corresponding to a right side of the above Equation (2) is represented by the product of a geometrical factor (in this case, $L_{near}$ and $L_{normal}$) represented by a detector distance and another correction coefficient $\alpha$. A left side of the above Equation (2) is experimentally obtained by collecting coincidence counting data at the same time using the same plate radiation source at the time of approach/at the time of non-approach. In the present embodiment, a short side transformed into an ellipse is adopted as the inter-detector distance $L_{near}$.

According to the sensitivity correction method according to the present embodiment, first, a sensitivity coefficient is obtained in the first sensitivity coefficient calculation step (step S1). After the first sensitivity coefficient calculation step (step S1), a sensitivity coefficient is obtained in the second sensitivity coefficient calculation step (step S2) before a change in arrangement of a plurality of radiation detecting elements (γ radiation detectors in the present embodiment) (at the time of non-approach in the present embodiment). After the second sensitivity coefficient calculation step (step S2), a sensitivity coefficient is obtained in the third sensitivity coefficient calculation step (step S3) in a state in which arrangement of the plurality of radiation detecting elements is changed (in the present embodiment, the detector heads 2A and 2B are close to each other). Specifically, in the first sensitivity coefficient calculation step (step S1), sensitivity coefficients classified according to sensitivity factors are obtained. Even when the arrangement of the plurality of radiation detecting elements (γ radiation detectors) is not changed, a non-geometric factor changes over time. Therefore, a sensitivity coefficient of a non-geometric factor is obtained in the second sensitivity coefficient calculation step (step S2) based on collected coincidence counting data before change of the arrangement of the plurality of radiation detecting elements (γ radiation detectors) (at the time of non-approach). Then, in the third sensitivity coefficient calculation step (step S3), a sensitivity coefficient derived from geometrical arrangement is obtained based on collected coincidence counting data in the state in which in which arrangement of the plurality of radiation detecting elements is changed (the detector heads 2A and 2B are close to each other). In this way, sensitivity correction of the radiation detecting elements (γ radiation detectors) is performed using the sensitivity coefficients obtained in the first sensitivity coefficient calculation step (step S1), the second sensitivity coefficient calculation step (step S2), and the third sensitivity coefficient calculation step (step S3), thereby obtaining a reconstructed image based on data after the sensitivity correction. As a result, even when arrangement of the plurality of radiation detecting elements (γ radiation detectors) included in the detector is variable and is not circular arrangement, it is possible to obtain a reconstructed image free of artifacts.

In the present embodiment, a sensitivity coefficient corresponding to the case in which arrangement of the plurality of radiation detecting elements is changed (the detector heads 2A and 2B are close to each other) is represented by the product of a sensitivity coefficient of a geometric factor obtained before change of arrangement (at the time of non-approach in the present embodiment) and a sensitivity coefficient of a non-geometric factor with regard to a combination in which a positional relation is invariant regardless of arrangement of the radiation detecting elements (γ radiation detectors) (the same detector head in the present embodiment). Further, the sensitivity coefficient is represented by the product of a sensitivity coefficient of a geometric factor obtained after change of arrangement (at the time of approach in the present embodiment) and a sensitivity coefficient of a non-geometric factor with regard to a combination geometrically affected by the positional relation of the radiation detecting elements (γ radiation detectors) (detector heads facing each other in the present embodiment).

When a sensitivity coefficient is obtained in a case in which the detector heads 2A and 2B are close to each other, the PET apparatus 1 (for example, a central processing unit (CPU)) determines whether a detector pair corresponds to the same detector head or the detector heads facing each other. In the case of the detector heads facing each other, switching to the sensitivity coefficient at the time of approach obtained from the plate radiation source $S_P$ illustrated in FIG. 4(c) is performed.

It is preferable to obtain the correction coefficient $\alpha$ from a ratio of coincidence counting data (the left side of the above Equation (2)) collected at the same time using the same calibration radiation source (the same plate radiation source in the present embodiment) before and after change of arrangement (at the time of approach/at the time of non-approach) of the plurality of radiation detecting elements (γ radiation detectors) as in the above Equation (2). Consequently, for example, in a case in which after another calibration radiation source (the former: first calibration radiation source, ring radiation source in the present embodiment) is used before change of arrangement, the same calibration radiation source (the latter: second calibration radiation source, plate radiation source in the present embodiment) is used before and after change of arrangement (at the time of approach/at the time of non-approach) of the plurality of radiation detecting elements (γ radiation detectors), it is possible to correct a difference between the former (the ring radiation source at the time of non-approach) before change of arrangement and the latter (the plate radiation source at the time of approach) after change of arrangement by multiplying the obtained correction coefficient α by the right side of the above Equation (1) in the former (ring radiation source).

In addition, coincidence counting data collected after change of arrangement (at the time of approach) of the plurality of radiation detecting elements (γ radiation detectors) corresponds to a combination geometrically affected at least by a positional relation of the radiation detecting elements (γ radiation detectors). That is, it is possible to obtain sensitivity coefficient data with respect to the combination geometrically affected by the positional relation of the radiation detecting elements (γ radiation detectors) (the detector heads facing each other in the present embodiment) based on the coincidence counting data collected after change of arrangement (at the time of approach).

In addition, in the first sensitivity coefficient calculation step (step S1), it is preferable to obtain the sensitivity coefficient using a calibration radiation source below. In more detail, when the rod-shaped radiation source $S_L$ (see FIG. 6) rotatable along the plurality of radiation detecting elements (γ radiation detectors) is used as in the present embodiment, the rod-shaped radiation source $S_L$ is rotated along the plurality of radiation detecting elements (γ radiation detectors), thereby being approximated to the ring radiation source $S_R$ illustrated in FIG. 4(a). In the first sensitivity coefficient calculation step (step S1), sensitivity coefficients classified according to sensitivity factors are obtained based on coincidence counting data collected by detecting radiation (γ-ray in the present embodiment) from the rotated rod-shaped radiation source $S_L$ (that is, the rod-shaped radiation source $S_L$ approximated to the ring radiation source $S_R$).

In addition, in the second sensitivity coefficient calculation step (step S2), it is preferable to obtain a sensitivity coefficient using a calibration radiation source below. In more detail, in the second sensitivity coefficient calculation step (step S2), it is possible to obtain a sensitivity coefficient of a non-geometric factor which changes over time based on coincidence counting data collected by detecting radiation (γ-ray) from the cylindrical radiation source $S_C$ imitating an actual test object before change of arrangement of the plurality of radiation detecting elements (γ radiation detectors) (at the time of non-approach).

In addition, in a case in which a plurality of (two in the present embodiment) detector heads, each of which includes the plurality of radiation detecting elements (γ radiation detectors), is included, and the respective detector heads are configured such that a distance between the respective detector heads can be changed, when arrangement of the plurality of radiation detecting elements (γ radiation detectors) is changed by bringing the respective detector heads close to each other, it is preferable to obtain a sensitivity coefficient using a calibration radiation source below. In more detail, when the respective detector heads are brought close to each other, there is concern that the rod-shaped radiation source rotatable along the plurality of radiation detecting elements (γ radiation detectors) or the ring radiation source provided along the plurality of radiation detecting elements (γ radiation detectors) may interfere with the respective detector heads. Therefore, as in the present embodiment, the plate radiation source $S_P$ illustrated in FIG. 4(c) disposed at a center of the respective detector heads is used as in the present embodiment. In the third sensitivity coefficient calculation step (step S3), a sensitivity coefficient derived from geometrical arrangement is obtained based on coincidence counting data collected by detecting radiation (γ-ray) from the plate radiation source $S_P$ in a state in which the respective detector heads are brought close to each other.

When such a plate radiation source $S_P$ is used, it is possible to prevent interference between the calibration radiation source and each detector head even when the respective detector heads are brought close to each other.

In addition, the radiation tomography device (the flexible PET apparatus supporting multi-modality 1) according to the present embodiment includes the arithmetic means (the arithmetic circuit 6 in FIG. 1) that performs the first sensitivity coefficient calculation step (step S1), the second sensitivity coefficient calculation step (step S2), and the third sensitivity coefficient calculation step (step S3) described in the sensitivity correction method according to the present embodiment. As described in the sensitivity correction method according to the present embodiment, a reconstructed image is obtained based on data after sensitivity correction by correcting sensitivities of the radiation detecting elements (γ radiation detectors) using the sensitivity coefficients obtained in the first sensitivity coefficient calculation step (step S1), the second sensitivity coefficient calculation step (step S2), and the third sensitivity coefficient calculation step (step S3). As a result, even when arrangement of the radiation detecting elements (γ radiation detectors) included in the detector is variable and is not circular arrangement, it is possible to obtain a reconstructed image free of artifacts.

[Reconstruction Result]

A cylindrical radiation source having a uniform radiation concentration of 300 mm in diameter was installed at the center of the apparatus (detector heads 2A and 2B) in the vicinity of a diameter of 778 mm to a diameter of 250 mm of the apparatus (detector heads 2A and 2B) to collect coincidence counting data. In a reconstruction result of incorporating a conventional element-by-element sensitivity correction method using a geometric factor of a ring radiation source and a non-geometric factor of a cylindrical radiation source, a geometric factor of non-approach is used, and thus artifacts occur in a reconstructed image. It was confirmed that artifacts are not present and an image is improved in a reconstruction result of inputting a non-geometric factor of a cylindrical radiation source, a geometric factor switched to an origin of a ring radiation source in an event within the same detector head and to an origin of a plate radiation source in an event within detector heads facing each other, and the correction coefficient α.

The invention is not limited to the above embodiment, and may be modified as follows.

(1) While radiation corresponds to the γ-ray in the above-described embodiment, it is possible to adopt radiation such as an α-ray, a β-ray, etc.

(2) While the DOI detector is adopted in the above-described embodiment, it is possible to apply a radiation detector which does not discriminate a depth direction.

(3) While the two detector heads 2A and 2B (see FIG. 2 to FIG. 4 and FIG. 6) have been described in the above-described embodiment, the number of detector heads is not limited to two. In a structure including a plurality of detector heads, each of which has a plurality of radiation detecting elements (γ radiation detectors in the embodiment), and the respective detector heads are configured such that a distance between the respective detector heads can be changed, three or more detector heads may be adopted.

(4) In the above-described embodiment, the rod-shaped radiation source $S_L$ (see FIG. 6) rotatable along the plurality of radiation detecting elements (γ radiation detectors in the embodiment) is used, and the rod-shaped radiation source $S_L$ is rotated along the plurality of radiation detecting elements (γ radiation detectors in the embodiment), thereby being approximated to the ring radiation source $S_R$ illustrated in FIG. 4(a). However, the ring radiation source $S_R$ illustrated in FIG. 4(a) or the plate radiation source $S_P$ illustrated in FIG. 7(a) may be rotated along the plurality of radiation detecting elements (γ radiation detectors). That is, it is possible to use the ring radiation source $S_R$ provided along the plurality of radiation detecting elements (γ radiation detectors) as illustrated in FIG. 4(a). In addition, in the case of using the plate radiation source $S_P$ rotatable along the plurality of radiation detecting elements (γ radiation detectors) as illustrated in FIG. 7(a), the plate radiation source $S_P$ may be rotated along the plurality of radiation detecting elements (γ radiation detectors).

(5) In the above-described embodiment, the plate radiation source $S_P$ illustrated in FIG. 4(c) installed at the center of the respective detector heads is used as the plate radiation source for calibration at the time of approach. However, it is possible to use the rod-shaped radiation source $S_L$ that can reciprocate along a central axis of each detector head illustrated in FIG. 7(b). That is, in the case of using the rod-shaped radiation source $S_L$ that can reciprocate along the central axis of each detector head illustrated in FIG. 7(b), the rod-shaped radiation source $S_L$ is reciprocated along the central axis of each detector head, thereby being approximated to the plate radiation source $S_P$.

Figure 7:
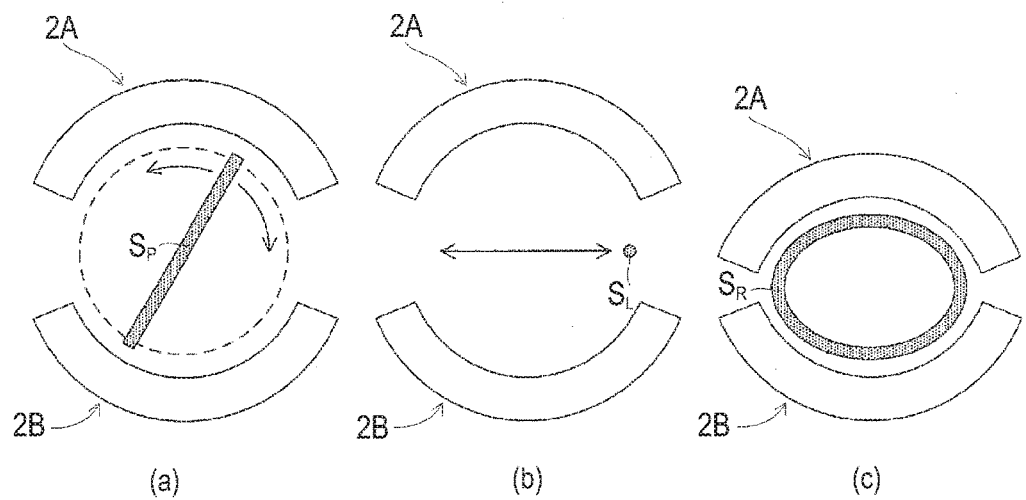
FIGS. 7(a) to 7(c) are schematic views of detector arrangement and types of a calibration radiation source according to modifications.

(6) While the ring radiation source $S_R$ having a perfect circle shape is used as illustrated in FIG. 4(a) in the above-described embodiment, it is possible to use a ring radiation source for calibration having a shape conforming to deformed detector arrangement (here, the ring radiation source $S_R$ having an elliptical shape illustrated in FIG. 7(c)). Alternatively, a rod-shaped radiation source rotatable in an elliptical orbit along the plurality of radiation detecting elements (γ radiation detectors in the embodiment) may be used, and the rod-shaped radiation source may be rotated in the elliptical orbit along the plurality of radiation detecting elements (γ radiation detectors), thereby being approximated to the ring radiation source $S_R$ having the elliptical shape illustrated in FIG. 7(c).

(7) In the above-described embodiment, a time before change of arrangement of the plurality of radiation detecting elements (γ radiation detectors in the embodiment) corresponds to the time of non-approach, and a time after the change of arrangement corresponds to the time of approach. However, the reverse thereof is allowed. That is, the time before the change of arrangement may correspond to the time of approach, and the time after the change of arrangement may correspond to the time of non-approach. Therefore, in the first sensitivity coefficient calculation step (step S1), sensitivity coefficient classified according to sensitivity factors are obtained based on coincidence counting data collected at the time of approach using the ring radiation source $S_R$ having the elliptical shape illustrated in FIG. 7(c). Further, in the third sensitivity coefficient calculation step (step S3), a sensitivity coefficient derived from geometrical arrangement is obtained based on coincidence counting data collected at the time of non-approach.

(8) The shape of the calibration radiation source in the first sensitivity coefficient calculation step (step S1), the second sensitivity coefficient calculation step (step S2), and the third sensitivity coefficient calculation step (step S3) is not particularly limited. It is sufficient to use a calibration radiation source having a shape conforming to the detector arrangement.

REFERENCE SIGNS LIST

1 Flexible PET apparatus supporting multi-modality (PET apparatus)

2A, 2B Detector head
3 γ radiation detector
$S_R$ Ring radiation source for calibration (ring radiation source)
$S_C$ Cylindrical radiation source for calibration (cylindrical radiation source)
$S_P$ Plate radiation source for calibration (plate radiation source)
$S_L$ Rod-shaped radiation source for calibration (rod-shaped radiation source)
α Correction coefficient

The invention claimed is:

1. A sensitivity correction method for a radiation detecting element detecting radiation generated from a radiopharmaceutical in a test object, the sensitivity correction method comprising:
a first sensitivity coefficient calculation step of obtaining sensitivity coefficients classified according to sensitivity factors based on coincidence counting data collected by a plurality of radiation detecting elements;
a second sensitivity coefficient calculation step of obtaining a sensitivity coefficient of a non-geometric factor based on the collected coincidence counting data before change of arrangement of the plurality of radiation detecting elements after the first sensitivity coefficient calculation step; and
a third sensitivity coefficient calculation step of obtaining a sensitivity coefficient derived from geometrical arrangement based on the collected coincidence counting data in a state in which the arrangement of the plurality of radiation detecting elements is changed after the second sensitivity coefficient calculation step,
wherein sensitivities of the radiation detecting elements are corrected using the sensitivity coefficients obtained in the first sensitivity coefficient calculation step, the second sensitivity coefficient calculation step, and the third sensitivity coefficient calculation step.

2. The sensitivity correction method according to claim 1, wherein a sensitivity coefficient corresponding to a case in which the arrangement of the plurality of radiation detecting elements is changed is represented by a product of a sensitivity coefficient of a geometric factor obtained before the change of the arrangement and a sensitivity coefficient of a non-geometric factor with respect to a combination in which a positional relation is invariant irrespective of the arrangement of the radiation detecting elements and is represented by a product of a sensitivity coefficient of a geometric factor obtained after the change of the arrangement and a sensitivity coefficient of a non-geometric factor with respect to a combination geometrically affected by a positional relation of the radiation detecting elements.

3. The sensitivity correction method according to claim 1, wherein a correction coefficient is obtained from a ratio of coincidence counting data collected at the same time using the same calibration radiation source before and after the change of the arrangement of the plurality of radiation detecting elements.

4. The sensitivity correction method according to claim 3, wherein when a different calibration radiation source from a first calibration radiation source is set to a second calibration radiation source after a predetermined calibration radiation source is used as the first calibration radiation source before the change of the arrangement of the plurality of radiation detecting elements, a correction coefficient is obtained from a ratio of coincidence counting data collected at the same time using the same second calibration radiation source before and after the change of the arrangement of the plurality of radiation detecting elements, and the correction coefficient is multiplied by an expression represented by a product of respective factors related to sensitivity correction in the first calibration radiation source.

5. The sensitivity correction method according to claim 1, wherein coincidence counting data collected after the change of the arrangement of the plurality of radiation detecting elements corresponds to a combination geometrically affected by at least a positional relation of the radiation detecting elements.

6. The sensitivity correction method according to claim 1, wherein sensitivity coefficients classified according to sensitivity factors are obtained based on coincidence counting data collected by detecting radiation from a rod-shaped radiation source for calibration rotatable along the plurality of radiation detecting elements, a ring radiation source for calibration provided along the plurality of radiation detecting elements, or a plate radiation source for calibration rotatable along the plurality of radiation detecting elements in the first sensitivity coefficient calculation step, and a sensitivity coefficient of a non-geometric factor is obtained based on coincidence counting data collected by detecting radiation from a cylindrical radiation source for calibration before the change of the arrangement of the plurality of radiation detecting elements in the second sensitivity coefficient calculation step.

7. The sensitivity correction method according to claim 1, wherein solid angle correction for correcting a detector distance is performed by dividing a crystal interference factor of a line of response (LOR) corresponding to a virtual straight line connecting two coinciding detectors by a square of a detector distance of the LOR.

8. The sensitivity correction method according to claim 1, wherein a plurality of detector heads, each of which has the plurality of radiation detecting elements, is included, and the respective detector heads are configured such that a distance between the respective detector heads is changeable, a plate radiation source for calibration installed at a center of the respective detector heads or a rod-shaped radiation source for calibration allowed to reciprocate along a central axis of the respective detector heads is used, and a sensitivity coefficient derived from geometrical arrangement is obtained based on collected coincidence counting data by detecting radiation from the plate radiation source for calibration or the reciprocating rod-shaped radiation source for calibration in a state in which the respective detector heads are brought close to each other in the third sensitivity coefficient calculation step.

9. A radiation tomography device performing radiation tomography by detecting radiation generated from a radiopharmaceutical in a test object, the radiation tomography device comprising:

a plurality of detector heads, each of which has a plurality of radiation detecting elements, the respective detector heads being configured such that a distance between the respective detector heads is changeable; and arithmetic means that performs an arithmetic operation, wherein the arithmetic means performs a first sensitivity coefficient calculation step of obtaining sensitivity coefficients classified according to sensitivity factors based on coincidence counting data collected by the plurality of radiation detecting elements, a second sensitivity coefficient calculation step of obtaining a sensitivity coefficient of a non-geometric factor based on the collected coincidence counting data before change of arrangement of the plurality of radiation detecting elements after the first sensitivity coefficient calculation step, and a third sensitivity coefficient calculation step of obtaining a sensitivity coefficient derived from geometrical arrangement based on the collected coincidence counting data in a state in which the arrangement of the plurality of radiation detecting elements is changed after the second sensitivity coefficient calculation step, and sensitivities of the radiation detecting elements are corrected using the sensitivity coefficients obtained in the first sensitivity coefficient calculation step, the second sensitivity coefficient calculation step, and the third sensitivity coefficient calculation step.

10. The radiation tomography device according to claim 9, wherein the detector heads are configured by disposing the respective radiation detecting elements in an arcuate shape.

* * * * *